Patented June 24, 1941

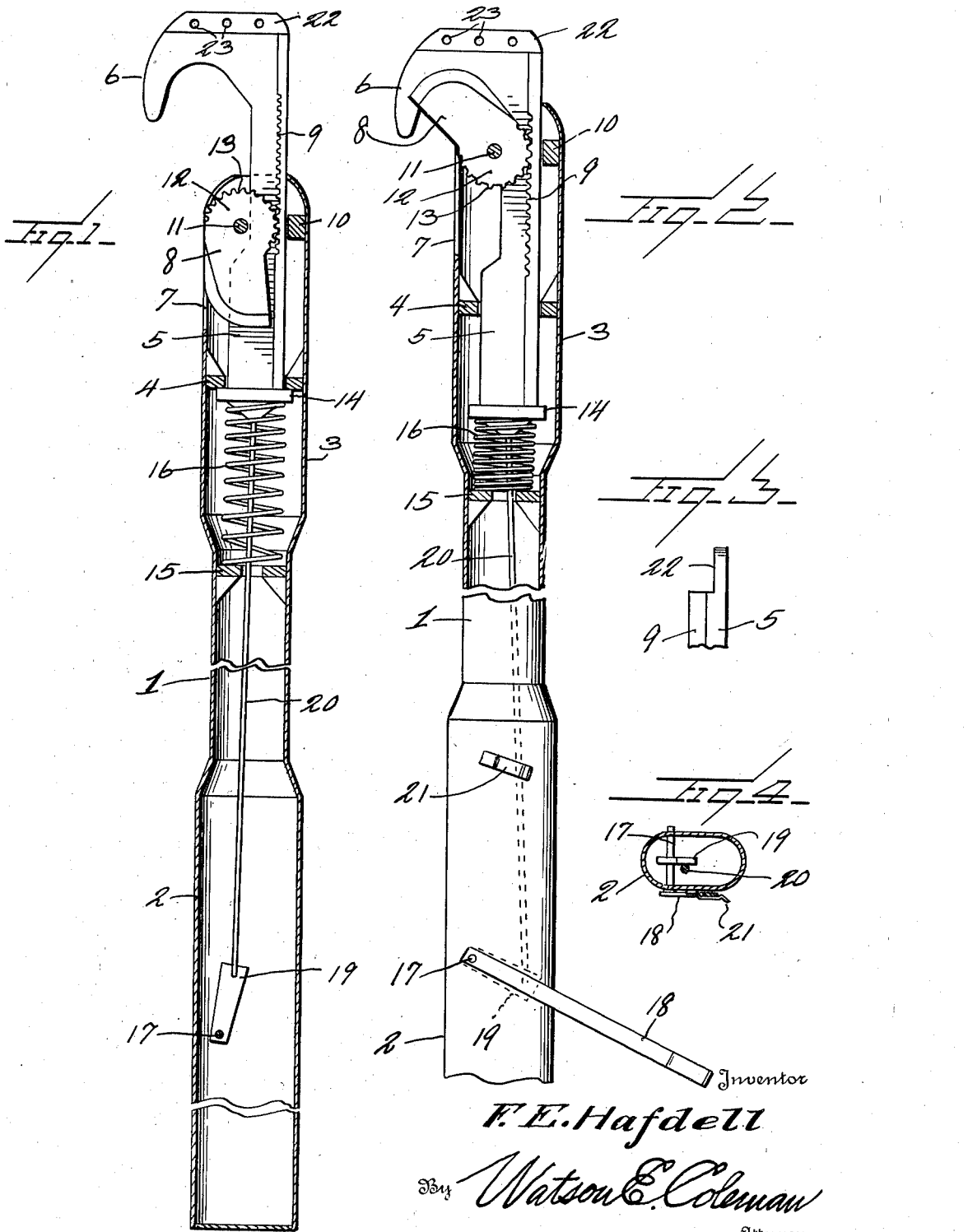

2,246,730

UNITED STATES PATENT OFFICE 2,246,730

PRUNING IMPLEMENT

Frank E. Hafdell, Lincoln, Nebr.

Application May 2, 1939, Serial No. 271,368

7 Claims. (Cl. 30—251)

This invention relates to the class of plant husbandry and pertains particularly to improvements in combination pole saws, tree hooks and clippers.

The present invention has for its primary object to provide an improved tree hook and limb clipper which is so designed that it may also be employed, after the attachment of a saw blade thereto, for sawing tree limbs and other parts, the device being constructed in such a manner that it may be inserted in between closely spaced limbs without difficulty and without getting parts hooked onto limbs which are not to be removed.

Another object of the invention is to provide a tree hook and clipper device which is designed to give a straight pull without bending the pole or handle carrying the hook and clipper, when operating upon limbs which are ordinary difficult to cut.

A further object of the invention is to provide a device of the above described character which is so designed that all ropes and levers are eliminated from the upper part of the device so that there are no extraneous portions which would catch in limbs when the hook is being placed in working position.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a longitudinal sectional view through the implement embodying the present invention, showing the hook and blade in separated position.

Fig. 2 is a view partly in section and partly in elevation of the device showing the hook and blade in cutting relation and illustrating the means for holding the operating lever.

Fig. 3 is a view in rear elevation of the upper part of the hook.

Fig. 4 is a sectional view taken through the handle above the lever holding clip to show the operation of the latter.

Referring now more particularly to the drawing, the numeral 1 generally designates the pole by which the hook and cutter are carried, which pole is in the form of a steel tube of suitable weight and which has approximately three feet of one end portion flattened slightly to form a handle 2, while approximately two feet of the pole extending from the upper end is also flattened to form the head portion 3.

Within the head portion 3 there is formed a guide collar or shoulder 4 through which slidably extends the elongated shank 5 which forms an integral part of a cutter hook 6. This shank extends upwardly through the collar 4 and from the open upper end of the head 3, the hook portion 6 being disposed above the head in the manner shown and being directed in a plane paralleling the sides of the head. The edge portion of the head lying in the plane of the hook 6 is provided with a suitable wall opening 7 for the extension from within the head of the oscillating or rocking cutter knife 8. The back of the shank 5 has formed integral therewith the laterally projecting longitudinally extending toothed rack 9, the teeth of which are directed forwardly or toward the opening 7. Fixed in the back of the head above the collar 4 is a guide 10 against which the rear or back edge of the rack bears in its movement longitudinally of the head.

Extending transversely of the head and across the forward edge of the shank 5 is a shaft 11 and upon this shaft the cutter blade 8 is mounted to rock. This blade has a rounded inner end portion 12, the edge of which is struck from the center of the shaft 11, and this rounded inner end of the blade is provided with gear teeth 13 which mesh with the teeth of the rack 9.

At its lower end the shank 5 of the hook carries a flange 14 which engages the collar or shoulder 4 and limits the upward movement of the hook. When the hook is at the limit of its upward movement through the head 3, the blade or knife 8 will be sheathed within the head and will be in the depending position in which it is shown and when the rack and the shank are drawn downwardly, the knife 8 will be rocked so as to come into cutting relation with the cutting edge of the hook.

Adjacent the lower end of the head 3, a second or lower stop shoulder is formed, as indicated at 15. This shoulder supports a coil expansion spring 16, the upper end of which bears against the lower end of the hook shank and normally tends to urge the same to move upwardly through the upper end of the head.

In the handle 2, at a suitable point inwardly from the lower end thereof, there is secured the transverse rock shaft or pin 17 and upon one end of this shaft, at the outside of the handle there is mounted the lever 18. Within the handle, there is secured to the shaft 17, the rock arm or crank 19, and this crank has secured thereto adjacent the free end thereof, an end of a pull rod 20 which extends longitudinally through the pole and has its other end attached to the lower end of the hook shank 5, the rod passing through the spring 16.

As will be readily apparent, the spring 16 will normally pull the rod upwardly and this will swing the lever 18 to a substantially upright position where it may be secured by a suitable clip 21 which is carried upon the side of the pole handle 2.

The upper end or head of the hook 6 is cut straight across, as shown, and provided with the transverse recess 22 through which are formed a number of bolt apertures 23. This formation of the hook provides for the attachment thereto of any one of the different types of saws which are employed by tree surgeons in the course of their work. Thus it will be seen that when a saw has been attached to the portion 22 of the hook and the lever 18 has been secured by the clip 21, the hook and shank will be held against movement and thus the entire unit becomes a handle for effecting the necessary reciprocatory motion of the saw for cutting limbs or other tree parts.

In the use of the present implement for clipping small branches, it will be readily obvious that by engaging the hook 6 over the branch and then pulling down upon the lever 18, the blade 8 will be swung outwardly and upwardly to meet the downwardly moving hook. With this device, the necessary pull may be applied to the hook while pulling down upon the lever 18 to swing the cutting blade upwardly, to effect the severance of the limb without bending the pole, whereas with those devices which are at present in use and which employ ropes or cables upon the outer side of the pole for oscillating the cutting knife, considerable bending of the pole occurs during the cutting operation, particularly if there is an especially hard limb or branch to cut. In addition, such outside manipulating means for the knife and hook have the undesirable features of becoming entangled in branches or limbs and of making it difficult to engage the hook over a particular limb where the limbs are placed close together.

What is claimed is:

1. A pruning implement of the character described, comprising an elongated tubular shaft having one end formed to provide a head and having said head provided with an end and a side wall opening, a hook having a relatively long straight shank extending into the open end of the head, guide means within the head for maintaining the shank in longitudinal alinement with the shaft as the shank is shifted longitudinally therein, a lever pivotally supported upon the shaft adjacent the end remote from the hook, coupling means between the lever and the shank for effecting reciprocatory movement of the shank and hook, a knife normally housed within the head and adjacent to the side wall opening, supporting means for the knife facilitating the movement of the latter outwardly through said side wall opening and in the direction of the adjacent end of the head, and coupling means between the knife and said shank for effecting the stated movement of the knife upon movement of the shank into the head, the hook being arranged with respect to the knife whereby the knife and hook will come into cutting relation when the shank is drawn into the head.

2. A pruning implement of the character described, comprising a tubular shaft having one end formed to provide a flattened head, the head being open at its end and having an edge wall provided with a longitudinally extending opening merging with the adjacent open end, a hook having a relatively long shank extending longitudinally into the head through said open end, the bill portion of the hook being alined with said edge wall opening, a knife pivotally supported within the head adjacent said edge wall opening and adapted to be oscillated for extension from the head through said opening for cooperative action with said hook, a rack and gear coupling between said hook shank and said knife whereby upon movement of the shank into the head, said knife will be swung through the opening toward the hook, an actuating lever pivotally connected with the shaft adjacent the end remote from the hook, and means coupling said lever with said shank and extending longitudinally within the shaft for effecting reciprocatory movement of the shank by the lever.

3. A pruning implement of the character described, comprising a tubular shaft having one end formed to provide a flattened head, the head being open at its end and having an edge wall provide with a longitudinally extending opening merging with the adjacent open end, a hook having a relatively long shank extending longitudinally into the head through said open end, the bill portion of the hook being alined with said edge wall opening, a knife pivotally supported within the head adjacent said edge wall opening and adapted to be oscillated for extension from the head through said opening for cooperative action with said hook, a rack and gear coupling between said hook shank and said knife whereby upon movement of the shank into the head, said knife will be swung through the opening toward the hook, an actuating lever pivotally connected with the shaft adjacent the end remote from the hook, means coupling said lever with said shank and extending longitudinally within the shaft for effecting reciprocatory movement of the shank by the lever, and spring means within the shaft engaging said shank and normally urging the same to move outwardly from said head, said knife being fully enclosed within the head when the hook and shank are at the limit of their outward movement.

4. A pruning implement of the character described, comprising a tubular shaft formed at one end to provide a handle, the opposite end of the shaft being formed to provide a flattened head which is open at its end and which has a longitudinally extending edge slot merging with the open end, a hook having a relatively long shank extending through said open end of the head and into the latter, guide means within the head for said shank facilitating rectilinear movement of the shank therein, a pivot pin extending transversely of the head across said opening, a knife supported upon said pin and adapted to be oscillated thereon to swing through the opening and toward the adjacent end of the head for cooperative action with said hook, a rack extending longitudinally of a face of said shank, a gear segment formed integral with the knife and concentrically with said pivot and engaging the rack, and means carried by the handle and operatively coupled with the inner end of the shank for effecting the rectilinear movement of the shank and hook.

5. A pruning implement of the character described, comprising a tubular shaft formed at one end to provide a handle, the opposite end of the shaft being formed to provide a flattened head which is open at its end and which has a longitudinally extending edge slot merging with the open end, a hook having a relatively long shank extending through said open end of the head and into the latter, guide means within the head for said shank facilitating rectilinear movement of the shank therein, a pivot pin extending transversely of the head across said opening, a knife supported upon said pin and adapted to be oscillated thereon to swing through the opening and toward the adjacent end of the head for cooperative action with said hook, a rack extending longitudinally of a face of said shank, a gear segment formed integral with the knife and concentrically with said pivot and engaging the rack, means carried by the handle and operatively coupled with the inner end of the shank for effecting the rectilinear movement of the shank and hook, said means comprising a lever, a shaft extending transversely through the handle and having the lever supported upon one end thereof, a crank arm within the handle and secured to the lever, and a rod coupling said crank arm with the inner end of the hook shank.

6. A pruning implement of the character described, comprising a tubular shaft formed at one end to provide a handle, the opposite end of the shaft being formed to provide a flattened head which is open at its end and which has a longitudinally extending edge slot merging with the open end, a hook having a relatively long shank extending through said open end of the head and into the latter, guide means within the head for said shank facilitating rectilinear movement of the shank therein, a pivot pin extending transversely of the head across said opening, a knife supported upon said pin and adapted to be oscillated thereon to swing through the opening and toward the adjacent end of the head for cooperative action with said hook, a rack extending longitudinally of a face of said shank, a gear segment formed integral with the knife and concentrically with said pivot and engaging the rack, means carried by the handle and operatively coupled with the inner end of the shank for effecting the rectilinear movement of the shank and hook, said means comprising a lever, a shaft extending transversely through the handle and having the lever supported upon one end thereof, a crank arm within the handle and secured to the lever, a rod coupling said crank arm with the inner end of the hook shank, and hook means carried by the handle for securing the lever in a position where the hook shank is fully extended from the head and said knife is fully retracted into the head.

7. A pruning implement, comprising an elongated shaft, means at one end thereof forming a longitudinally directed guide, a hook having a long shank slidably supported in said guide for movement longitudinally of the shaft, means connected between the shaft and the shank for urging the shank to move in one direction longitudinally of the shaft, means for limiting movement of the shank in the said one direction, a pivot element supported by the shaft adjacent to and having its pivotal axis extending transversely of the shank, a knife oscillatably supported on said pivot for cutting movement toward the hook, a rack and gear coupling between the shank and knife for oscillating the knife toward the hook upon movement of the shank in the said one direction in opposition to said urging means, and means connected with the shank facilitating the movement of the same against said urging means.

FRANK E. HAFDELL.